(12) United States Patent
Kim

(10) Patent No.: US 9,223,355 B2
(45) Date of Patent: Dec. 29, 2015

(54) LATCH SYSTEM

(75) Inventor: Kwang Ho Kim, Santa Clara, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 1026 days.

(21) Appl. No.: 13/201,857

(22) PCT Filed: Feb. 28, 2009

(86) PCT No.: PCT/US2009/035603
§ 371 (c)(1),
(2), (4) Date: Aug. 17, 2011

(87) PCT Pub. No.: WO2010/098774
PCT Pub. Date: Sep. 2, 2010

(65) Prior Publication Data
US 2011/0299233 A1    Dec. 8, 2011

(51) Int. Cl.
*E05C 1/02* (2006.01)
*G06F 1/16* (2006.01)
*E05C 1/08* (2006.01)
*E05C 1/12* (2006.01)
*H05K 5/00* (2006.01)
*H05K 7/00* (2006.01)

(52) U.S. Cl.
CPC .............. *G06F 1/1679* (2013.01); *E05C 1/08* (2013.01); *Y10T 292/096* (2015.04)

(58) Field of Classification Search
CPC .............................. E05C 1/08; Y10T 292/096
USPC ........ 292/137, 175, 34, DIG. 112; 455/550.1; 361/379.01, 679.57, 679.58
See application file for complete search history.

(56) References Cited

U.S. PATENT DOCUMENTS

| | | | | | |
|---|---|---|---|---|---|
| 1,768,326 | A | * | 6/1930 | Miller | 292/153 |
| 2,230,096 | A | * | 1/1941 | Voight | 292/169.13 |
| 2,250,036 | A | * | 7/1941 | Schlage | 292/1.5 |
| 2,423,988 | A | * | 7/1947 | Lickteig | 292/169.19 |
| 2,479,174 | A | * | 8/1949 | Lickteig | 292/169.19 |
| 2,497,750 | A | * | 2/1950 | Wardwell, Jr. | 292/169.13 |
| 2,632,664 | A | * | 3/1953 | Quigley | 292/169.13 |
| 2,683,015 | A | * | 7/1954 | Campbell | 267/140.11 |
| 2,763,888 | A | * | 9/1956 | Billeter | 16/59 |
| 3,020,073 | A | * | 2/1962 | Williams | 292/169.21 |
| 3,089,720 | A | * | 5/1963 | Schlage | 292/169.19 |
| 3,099,050 | A | * | 7/1963 | Hetman | 49/421 |
| 3,343,860 | A | * | 9/1967 | Kohler | 292/169.16 |
| 3,353,858 | A | * | 11/1967 | Neary et al. | 292/164 |

(Continued)

FOREIGN PATENT DOCUMENTS

EP       1403460        3/2004

OTHER PUBLICATIONS

ISA/KR, PCT International Search Report dated Nov. 30, 2009, PCT/US2009/035603 filed Feb. 28, 2009.

*Primary Examiner* — Kristina Fulton
*Assistant Examiner* — Faria Ahmad
(74) *Attorney, Agent, or Firm* — Hewlett-Packard Patent Department

(57) ABSTRACT

A latch system employs momentum exchange impact damping. A latch is slideably arranged within a housing so that the latch can slide between a latch position and a release position. A damper spring urges a damper against a wedge of the latch. When a mechanical impact urges said latch toward the release position, the latch wedge impacts the damper so as to exchange momentum from the latch to the damper so that the latch remains in the latch position.

16 Claims, 8 Drawing Sheets

(56) References Cited

U.S. PATENT DOCUMENTS

| | | | |
|---|---|---|---|
| 3,531,069 A * | 9/1970 | Dubberley | 248/565 |
| 3,933,380 A * | 1/1976 | Wellekens | 292/175 |
| 4,082,342 A * | 4/1978 | Ailshie et al. | 296/190.06 |
| 4,126,302 A * | 11/1978 | Curnutt | 267/221 |
| 4,183,565 A * | 1/1980 | Allemann | 292/163 |
| 4,482,178 A * | 11/1984 | Damiana | 292/175 |
| 4,483,639 A * | 11/1984 | McCandless, II | 403/317 |
| 4,496,178 A * | 1/1985 | Best et al. | 292/1.5 |
| 4,512,597 A * | 4/1985 | Nabb et al. | 292/143 |
| 4,718,706 A * | 1/1988 | Fang | 292/1.5 |
| 4,729,585 A * | 3/1988 | Lin | 292/1.5 |
| 4,779,908 A * | 10/1988 | Foshee et al. | 292/163 |
| 5,082,317 A * | 1/1992 | Delaney, Jr. | 292/251.5 |
| 5,551,187 A * | 9/1996 | Brouwer et al. | 49/1 |
| 5,600,868 A | 2/1997 | Tourville et al. | |
| 5,649,309 A * | 7/1997 | Wilcox et al. | 455/575.3 |
| 5,746,458 A * | 5/1998 | Fisher | 292/252 |
| 6,099,049 A * | 8/2000 | Peng | 292/251 |
| 6,371,535 B2 * | 4/2002 | Wei et al. | 292/175 |
| 6,525,929 B2 | 2/2003 | Carr | |
| 6,662,603 B2 * | 12/2003 | Morris | 70/107 |
| 6,680,843 B2 | 1/2004 | Farrow et al. | |
| 6,859,978 B2 * | 3/2005 | Pan | 16/292 |
| 6,874,829 B2 * | 4/2005 | Muller | 292/336.3 |
| 6,920,668 B2 | 7/2005 | Hayashi | |
| 6,990,711 B2 * | 1/2006 | Koshikawa et al. | 16/334 |
| 7,028,373 B2 * | 4/2006 | Harmon et al. | 16/284 |
| 7,267,379 B2 * | 9/2007 | Rusiana | 292/332 |
| 7,657,970 B2 * | 2/2010 | Artsiely | 16/85 |
| 7,841,632 B2 * | 11/2010 | Tracy et al. | 292/163 |
| 8,107,257 B2 * | 1/2012 | Moorehead et al. | 361/801 |
| 8,254,118 B2 * | 8/2012 | Liu | 361/679.58 |
| 8,272,102 B2 * | 9/2012 | Zhou et al. | 16/307 |
| 8,814,233 B2 * | 8/2014 | Leska et al. | 292/341.16 |
| 2004/0166890 A1 | 8/2004 | Gordecki | |
| 2005/0174724 A1 | 8/2005 | Chen | |
| 2006/0068859 A1 * | 3/2006 | Lee et al. | 455/575.4 |
| 2006/0126281 A1 | 6/2006 | Kwon | 361/681 |
| 2006/0133015 A1 | 6/2006 | Lin et al. | 361/681 |
| 2006/0172764 A1 | 8/2006 | Makino | 455/550.1 |
| 2007/0026888 A1 * | 2/2007 | Zhou | 455/550.1 |
| 2007/0069524 A1 * | 3/2007 | Lin | 292/175 |
| 2007/0254691 A1 * | 11/2007 | Lu | 455/550.1 |
| 2007/0284891 A1 * | 12/2007 | Polowinczak et al. | 292/175 |
| 2008/0316694 A1 | 12/2008 | Yang et al. | |
| 2009/0315341 A1 * | 12/2009 | Willcox | 292/163 |
| 2011/0299233 A1 * | 12/2011 | Kim | 361/679.01 |
| 2014/0099990 A1 * | 4/2014 | Lee et al. | 455/550.1 |
| 2014/0259956 A1 * | 9/2014 | Bernhagen et al. | 49/503 |

* cited by examiner

LATCH SYSTEM

CROSS-REFERENCE TO RELATED APPLICATION

This application is a national stage application under 35 U.S.C. §371 of PCT/US2009/035603, filed Feb. 28, 2009.

BACKGROUND

Latches can generally be actuated inadvertently. Such inadvertent latch actuation can result in undesired unlatching of a secured item.

DETAILED DESCRIPTION

All-in-one computers integrate computing components and a display into a single housing. Some all-in-one computers provide an access panel on the back (the side opposite the display) for servicing and upgrades (e.g., installing memory). The access panel may be covered by a hinged stand when the all-in-one computer is in a shipping position.

For servicing, the all-in-one computer can be laid display-down on a surface. The stand can be pivoted to and latched in an open position to provide access to the access panel and, when the access panel is removed, to the interior of the all-in-one computer. If the latch inadvertently fails, the stand may collapse toward a closed position, potential injuring a hand or fingers of a user or technician working on the computer.

Figure 1:
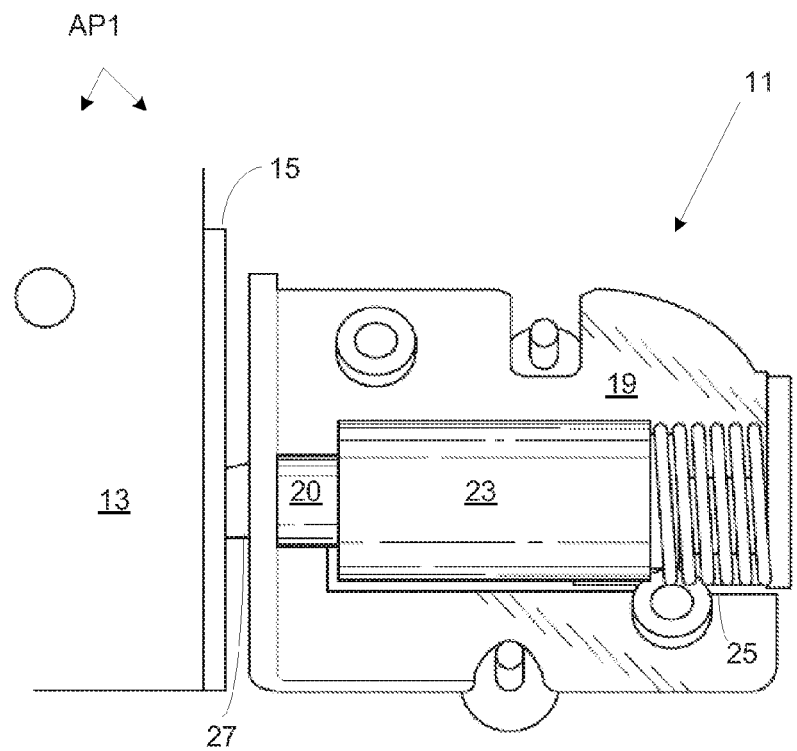
FIG. 1 is a bottom view of a latch system.
Figure 2:
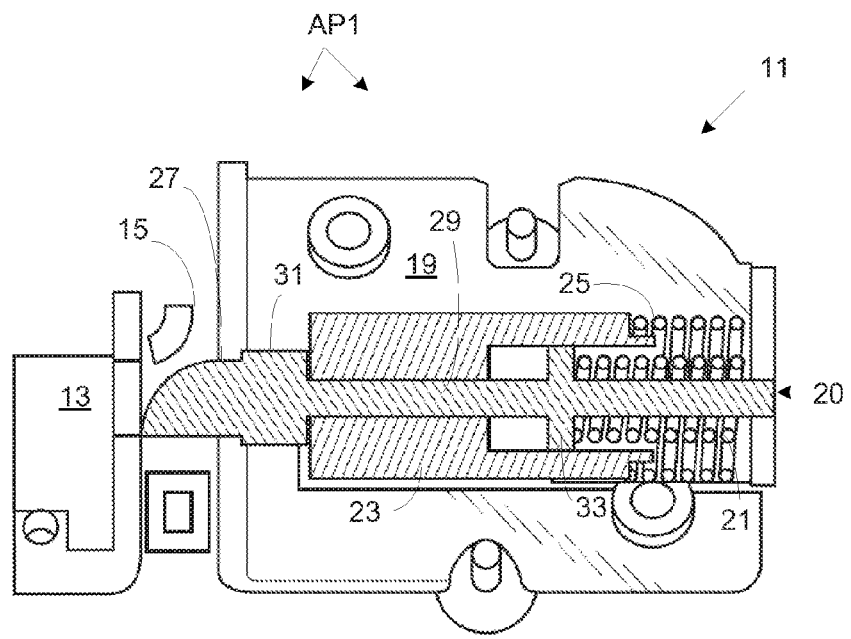
FIG. 2 is a side sectional view of the latch system of FIG. 1.

A latch system AP1, shown in FIGS. 1 and 2, prevents a sudden unintended collapse of a hinged assembly without requiring detents that can fail due to wear and tear. Latch system AP1 includes a latch mechanism 11 and a hinge 13. Hinge 13 includes a strike plate 15. Latch mechanism 11 includes a latch housing 19, a latch 20, a latch spring 21, an impact damper 23, and a damper spring 25. Latch 20 includes a wedge 27, an elongated shaft 29, a damper stop 31, and a spring stop 33. Shaft 29 extends at least partially through damper 23, and latch spring 21 extends at least partially through damper spring 25.

Figure 3:
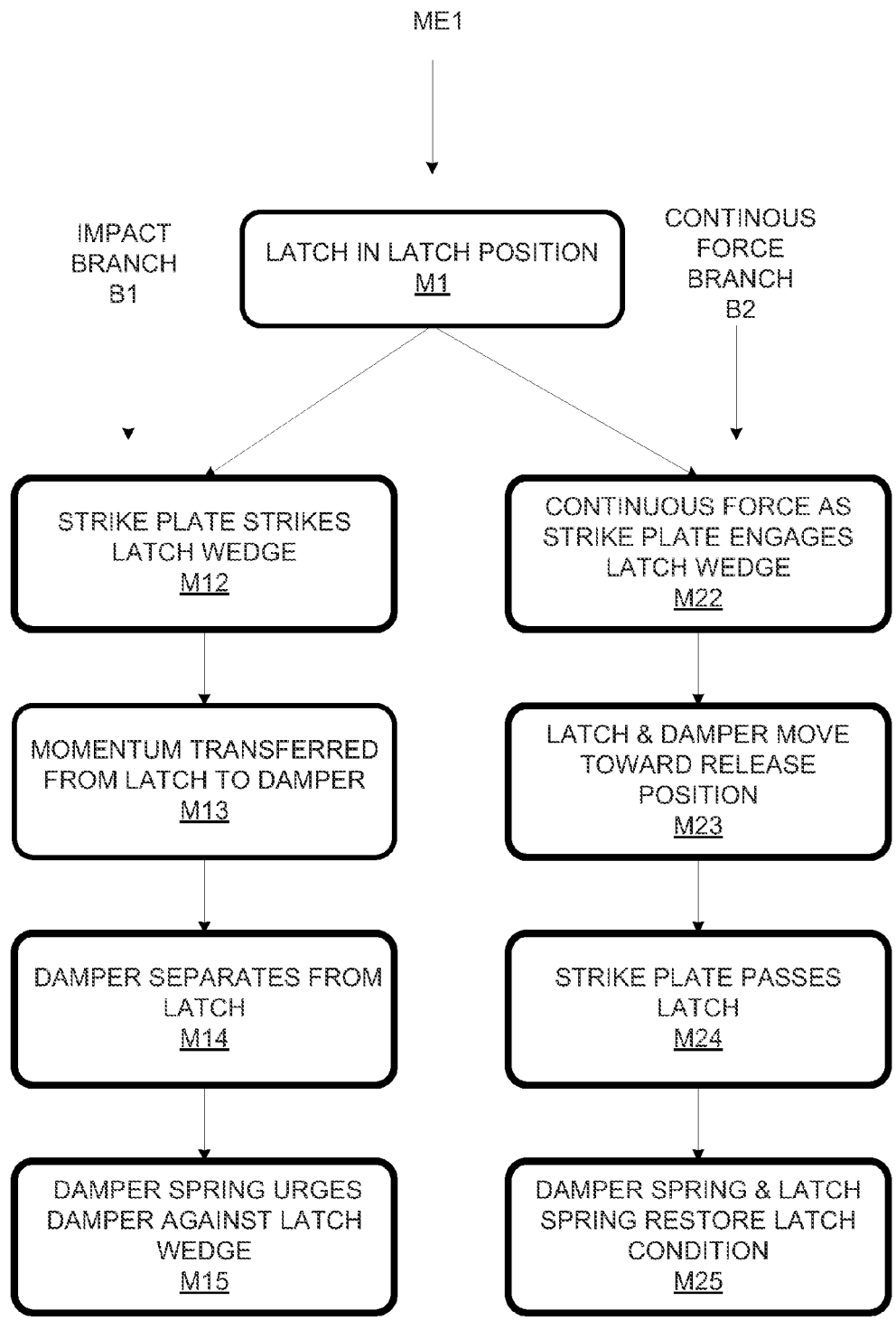
FIG. 3 is a flow chart of a method according to which the latch system of FIG. 1 responds to an impact and to a continuous force.

Operation of latch system. AP1 is in accordance with a method ME1, flow-charted in FIG. 3. Method ME1 begins at method segment M1 with latch system AP1 in latch position, which is the situation in FIGS. 1 and 2. In particular, latch 20 is urged forward to a latch position against a feature of latch housing 19. Damper 23 is urged by damper spring 25 against the back of damper stop 31 of latch 20 so that impact damper 23 abuts latch 20.

Figure 4:
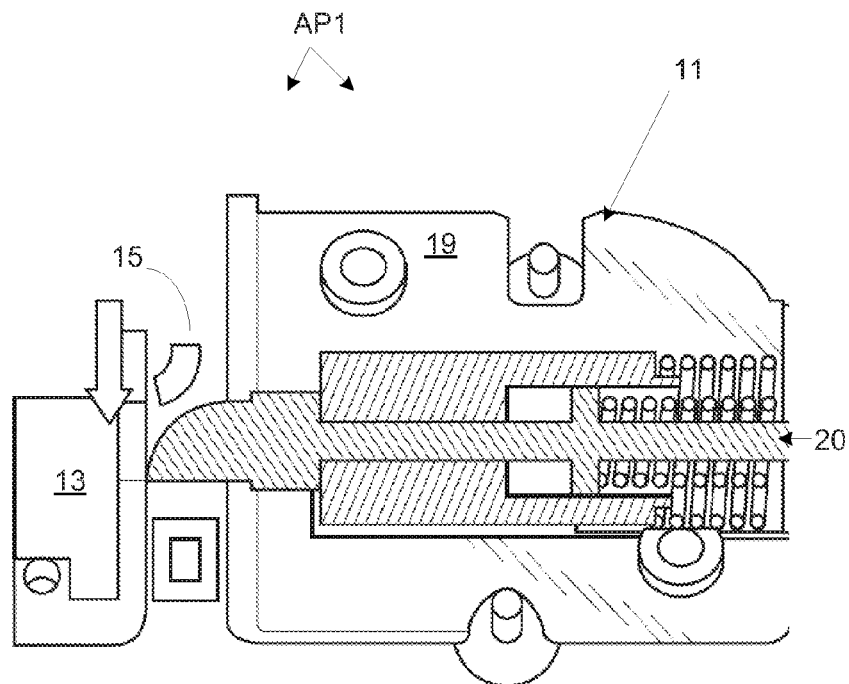
FIGS. 4-11 are side sectional views of the latch system of FIG. 1 at different stages of the method of FIG. 3.
Figure 5:
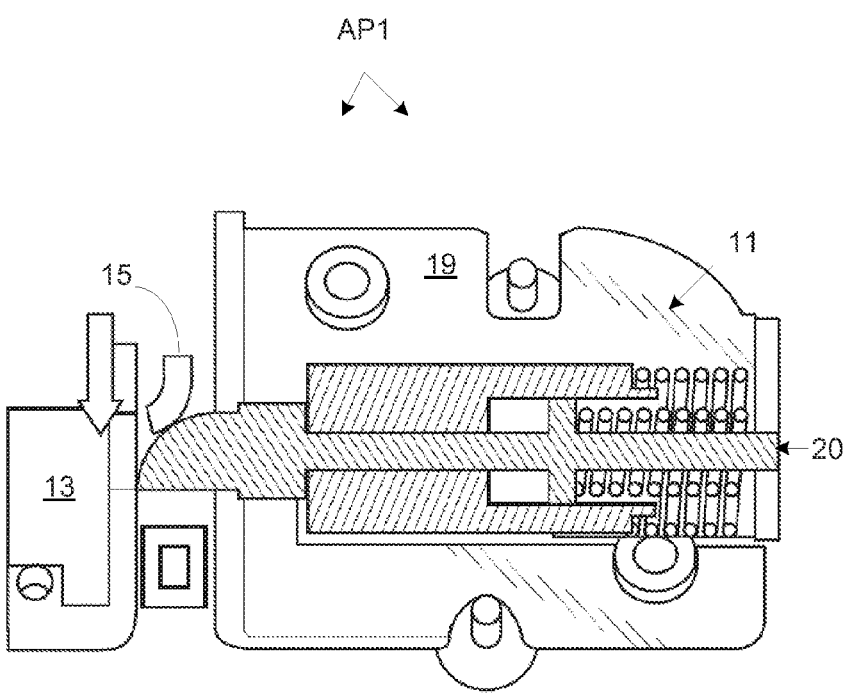

From method segment M1, method ME1 divides into an "impact" branch B1, and a "continuous-force" branch B2. At method segment M12 of branch B1, strike plate 15 impacts latch wedge 27 so as to direct latch from its latch position toward a release position (in which latch spring 21 would compress). This impact is indicated by the transition between FIG. 4 (in which strike plate 15 is moving toward latch wedge 27) and FIG. 5 (in which strike plate 15 is contacting latch wedge 27). As a result of the impact, momentum is transferred to latch 20.

Figure 6:
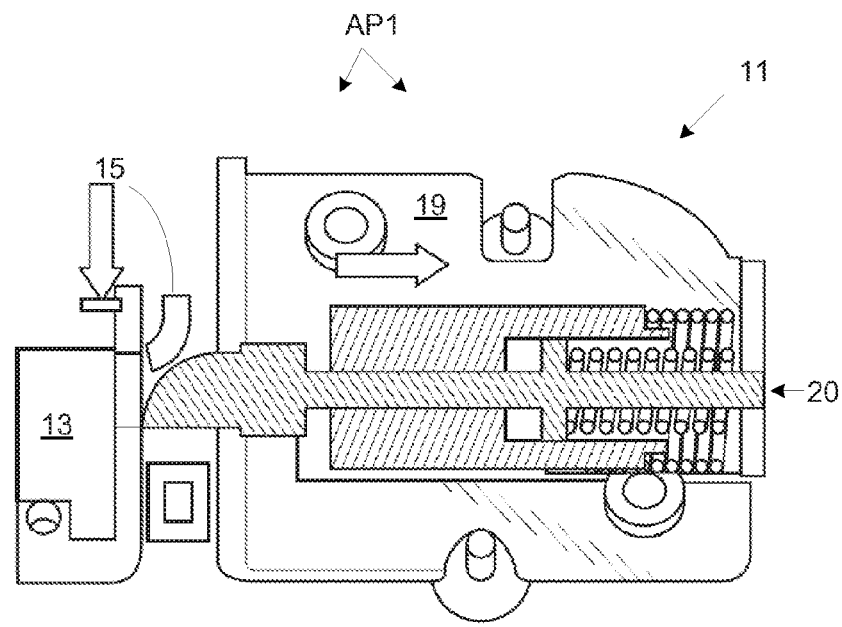
Figure 7:
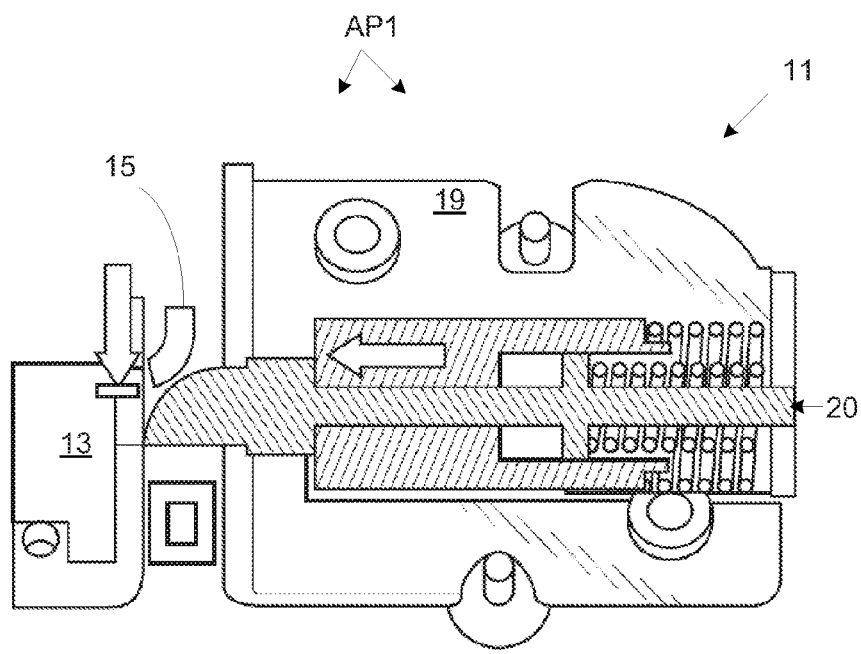

Instead of responding to this impact by moving toward a release position, latch 20 exchanges its momentum with abutting damper 23, at method segment M13. This causes damper 23 to move in the release direction, compressing damper spring 25 at method segment M14, during which damper 23 separates from and no longer abuts latch 20 (as shown in FIG. 6), which remains in its latch position. At method segment M15, damper spring 25 forces damper 23 back against latch stop 31 so that damper 23 again abuts latch 20, as indicated in FIG. 7. Since latch 20 did not exit the latch position, strike plate 15 does not clear latch wedge 27. In the context of a monitor stand, collapse is prevented.

Figure 8:
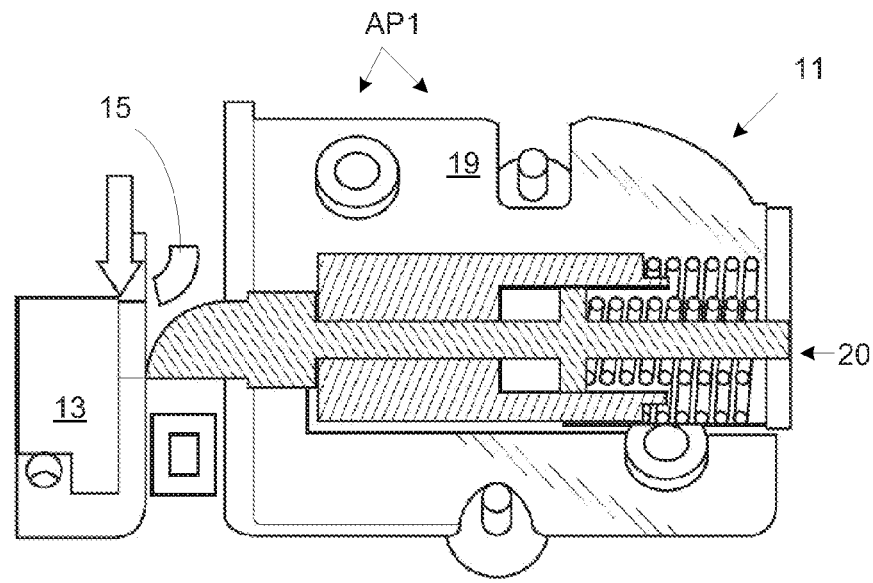
Figure 9:
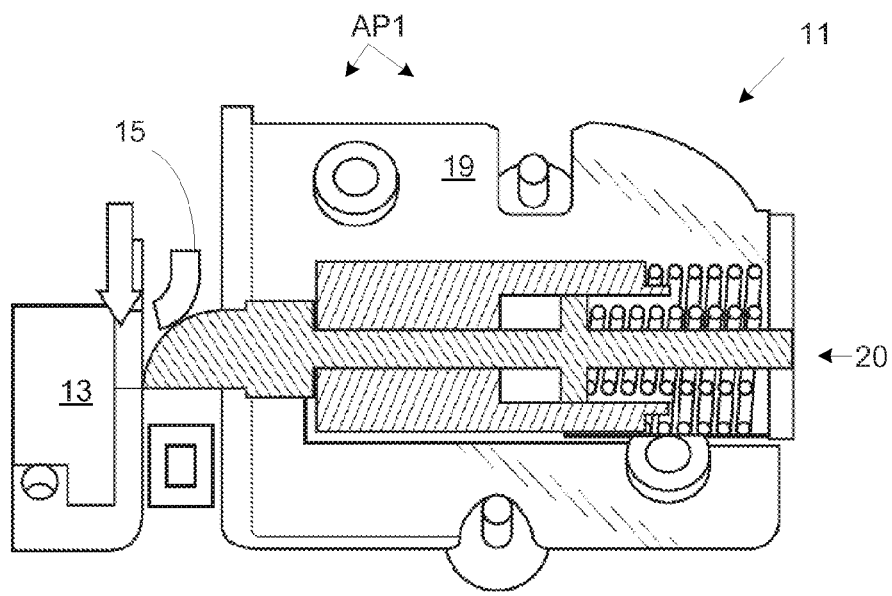
Figure 10:
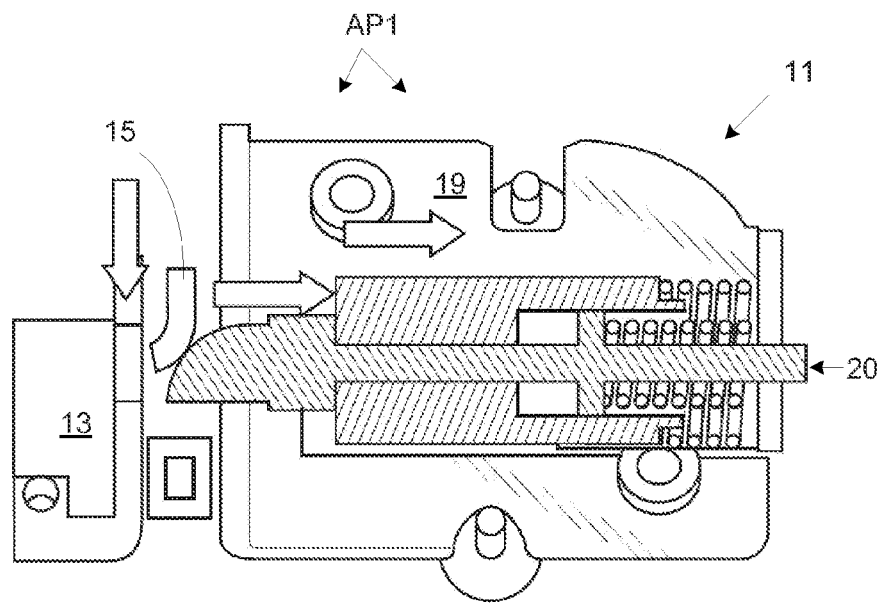
Figure 11:
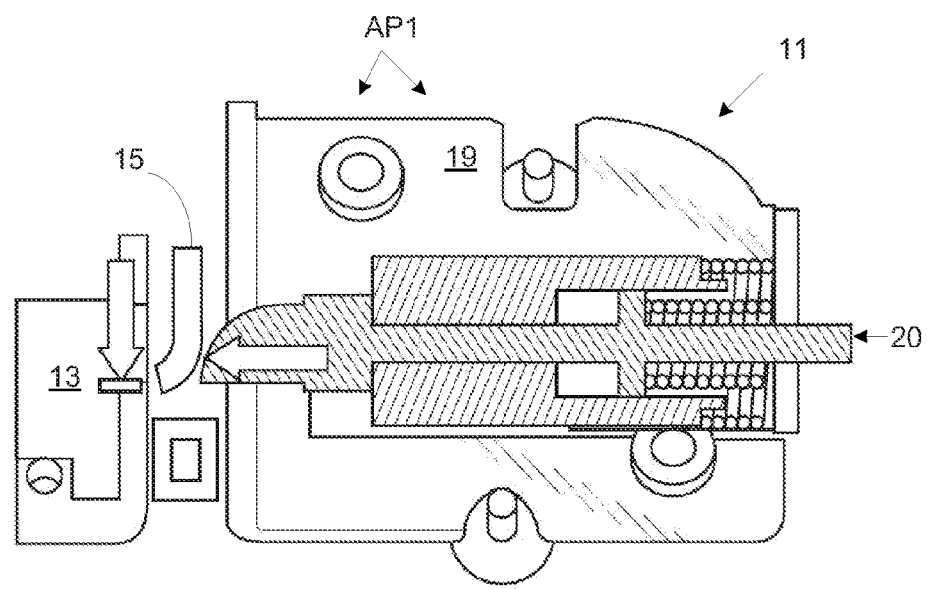

At method segment M22 of branch B2, hinge 13 is moved under a user's control to a folding position, as indicated in FIG. 8. When strike plate 15 contacts latch 20, latch stop 31 engages damper 23, as indicated in FIG. 9. At method segment M23, further continuous force from the user causes latch 20 and damper 23 to move toward the release position together, as indicated in FIG. 10. At method segment M24, strike plate 15 is able to clear latch 20, as indicated in FIG. 11. At method segment M25, damper spring 25 and latch spring 21 restore damper 23 and latch 21 to the latch position.

Figure 12:
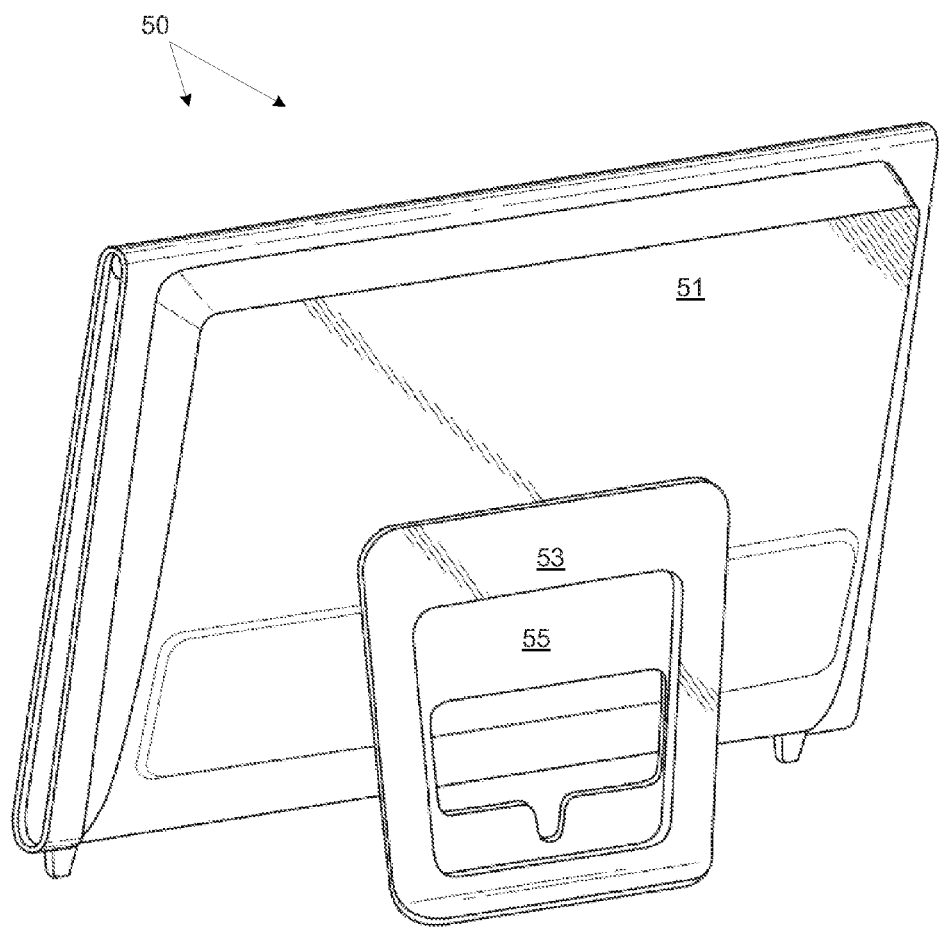
FIG. 12 is a rear perspective of an all-in-one computer including the latch system of FIG. 1.

Latch system AP1 is used in the context of an all-in-one computer 50, shown in FIG. 12. All-in-one computer 50 is shown having a body 51, a stand 53, and a service cover 55. Cover 55 can be removed to expose computer internal components, e.g., for adding or replacing a memory module, as shown in FIG. 13.

Figure 13:
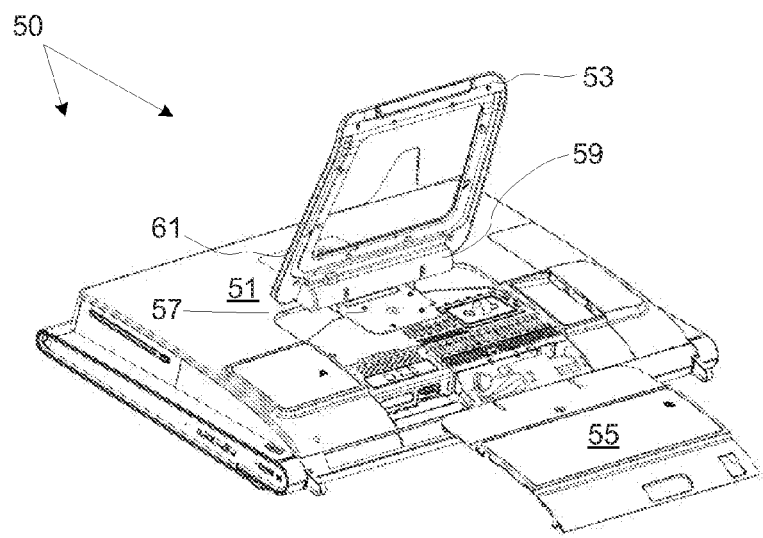
FIG. 13 is a rear perspective view of the computer of FIG. 12 is a service position with a cover removed.

In FIG. 13, computer 50 is shown in a service position with stand 53 in a fully open position with respect to a hinge bracket 57, which is attached flush to computer body 51. Cover 55 has been removed from body 51 to provide access to internal components of computer 50, e.g., so that memory modules can be added. A hinge cover 59 includes a release 61, for releasing stand 53 from a fully open position. If stand 53 suddenly collapses toward a closed position (against body 51) and onto a user's hand (e.g., while the user is inserting a memory module), injury could result. Latch system AP1 helps prevent such a collapse and associated injury.

Figure 14:
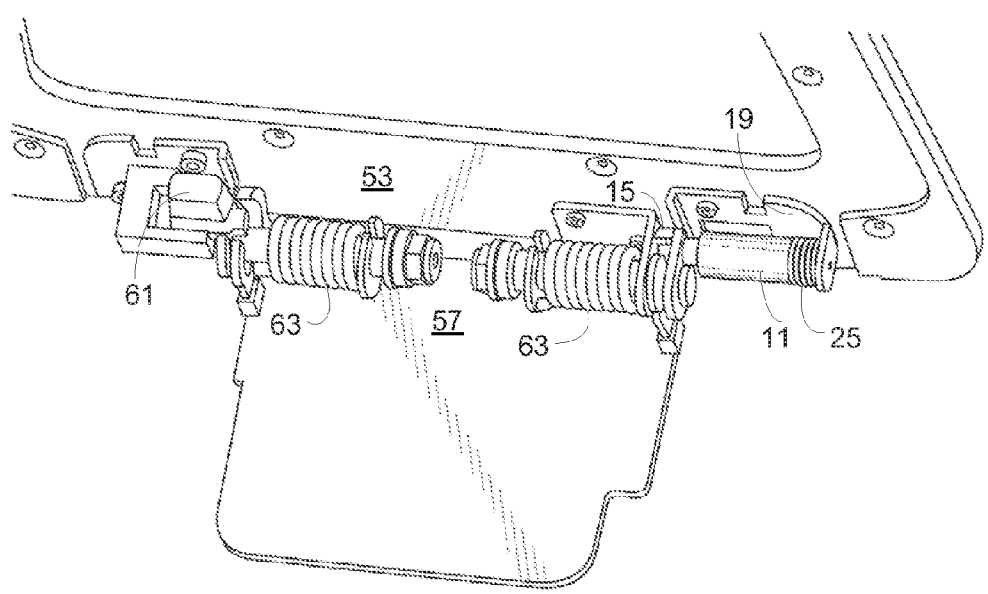
FIG. 14 is a perspective view of a stand of the computer of FIG. 12.

Stand 53 is shown in greater detail in FIG. 14 with hinge cover 59 removed. Hinge springs 63 urge stand 53 to close. A locking mechanism is designed to prevent this closing until release 61 is activated. However, if the locking mechanism fails, latch mechanism 11 prevents stand 13 from suddenly closing.

In the context of stand 53, latch system AP1 positively stops the stand when accidentally released from the fully open position. Unlike the conventional friction detent system, where the performance of the detent deteriorates with the wear of the detent features, the performance of latch system AP1 does not change with repeated use. Latch system allows the user to switch the stand between service and shipping positions without any manual operation of the latch. Unlike the detent based stand system, latch system AP1 operates with continuous force feedback and results in an enhanced user experience. Latch system AP1 can be totally enclosed in a housing hidden from the user and is not subject to mishandling, confusion, or damage.

While a conventional latch system can be designed to automatically lock and release the hinge during the normal user operation, it may not stop the accidentally released stand. The forces involved in normal user operation of the stand and the accidental release of the stand are very much different in nature. While the force applied to the stand by a user during a normal operation is static in nature, the forces resulting from an accidental release of the stand are dynamic in nature. The dynamic force of the closing stand can easily overcome the spring force of the latch if the latch is designed to move in either direction: release and lock. If a very stiff spring latch or a detent is used, it may be set to stop the accidentally released stand, but the user operation of such stand may involve a large force to overcome the spring or detent force, interfering with usability. If a deadbolt type latch is used, the action is in one way and may involve a user to manually release the latch. Latch system AP1 combines a two-way sliding latch system and an impact-damper system so as to provide for stopping the accidentally released stand as well as to release it without additional means of manually controlling the latch.

Latch system AP1 can stop an accidentally closing stand before it reaches a point where a user's hand may be trapped between the closing stand and the chassis of the monitor. The engagement of the latch with the accidentally closing stand is accomplished by utilizing the dynamic response characteristics of the latch system to the impulse input. The response of the latch system to a static force input such as folding the stand automatically releases the latch from the locked position. A computer or monitor product that incorporates latch system AP1 may omit conventional shipping detent mechanisms in the stand hinge; therefore, the folding and unfolding of the stand involves a minimum force; the operation of the stand is smooth with steady force feedback.

Latch system AP1 also provides audible feedback to the user when the unfolding stand reaches the closed service position. Latch system AP1 includes three main functional assemblies, stand hinge, sliding latch mechanism, and impact damper assembly as shown in FIG. 1. Strike plate 15 is a part of the stand hinge system and rotates about the axis of the hinge shaft when the stand is operated. Strike plate 15 is a metal part formed with a curved surface and is located on the hinge so that it interfaces with a wedge profile of the sliding latch.

The interaction between strike plate 15 and sliding latch 20 changes the direction of the force imparted by the closing stand to a direction that is parallel to the axis of the hinge. This change of direction of force also dissipates some of the impact energy through friction and reduces the linear momentum of the sliding latch, making it more manageable by the impact damper assembly. The strike plate may be formed from a part of the conventional hinge system by modifying it with a contoured surface. Or, it may be a separate metal part that is added to the conventional hinge axis.

The spring constants of the return springs of the latch and the damper are determined so that the combined spring force can overcome the spring torque of the stand hinge spring so that the latch stays engaged in a closed position after the transient of the impact response. When the user opens the stand from the completely folded shipping position, the return spring automatically pushes the latch in the armed position and provides the user with the audible feedback that the stand is fully unfolded to the service position.

When the speed of the closing stand is high as in the case where the open stand becomes accidentally released (FIGS. 3-7), the interaction between stand, sliding latch, and impact damper is dynamic in nature. When the stand is accidentally released from the fully opened position, the potential energy stored in the hinge spring is converted into a kinetic energy. A part of this energy is imparted upon the sliding latch through the interaction between the strike plate and the wedge end of the sliding latch. This energy is transferred to the sliding latch and the linear momentum sets the latch in motion towards the impact damper. However, because the impact damper mass abuts the latch mass by the preloading return spring, the imparted linear momentum is transferred to the mass of the impact damper without moving the latch mass.

The linear momentum sets the mass of the damper in motion away from the latch while the sliding latch stays in position so that the impact damper does not abut the latch. The rebounding damper mass counters any transient motion of the latch. Since the latch does not move enough distance, the strike plate of the stand cannot clear the latch and the stand stops at the latch position at the end of the impact transient. The combined force of the return springs on the sliding latch and the damper overcomes the spring torque of the hinge spring and the stand remained stable at the latch position after the transient.

When the speed of the closing stand is low as in the case (FIGS. 8-11) where the user tries to fold the stand beyond the safety latch position for storage or shipping, the interaction between the three bodies are static in nature. The impact damper is degenerated as a simple spring and the sliding latch and the damper mass move together as the user pushes the stand down to the shipping position. As the stand closes, the force applied to the stand by the user is amplified by the long moment of the arm of the stand and easily overcomes the return spring force. The strike plate clears the sliding latch and the stand reaches the fold position.

Alternative latch systems can be used in various types of stands and in other contexts to provide ready intended motions while preventing sudden motions in response to impacts. Different dimensions of the latch and other components can be employed, as can different materials. These and other variations upon and modifications to the illustrated latch system are provided for by the following claims.

What is claimed is:

1. A latch system comprising:
a latch slideable between a latch position and a release position, said latch having a latch wedge and a damper stop;
a latch spring urging said latch toward said latch position;
an impact damper; and
a damper spring urging said impact damper against said damper stop, wherein, in response to a transient mechanical impact applied on said latch wedge,
a momentum of said transient mechanical impact is transferred through said latch wedge to said impact damper to cause said impact damper to move away from said damper stop and against said damper spring, while said latch remains in said latch position responsive to a force applied by said latch spring,
wherein said impact damper is moveable by said damper spring back to engage said damper stop after said impact damper has moved away from said damper stop in response to said transient mechanical impact, to maintain said latch in said latch position.

2. A latch system as recited in claim 1, wherein, in response to a continuous force applied on said latch wedge urging said latch toward said release position, said latch moves with said impact damper toward said release position.

3. A latch system as recited in claim 1, further comprising a hinge with a strike plate, said transient mechanical impact involving said strike plate impacting said latch wedge as said hinge opens or closes.

4. A latch system as recited in claim 1, wherein said latch includes an elongated shaft that extends at least partially through said impact damper.

5. A latch system as recited in claim 1, wherein said latch spring extends at least partially through said damper spring.

6. A latch system as recited in claim 1, wherein said latch includes a spring stop, said latch spring contacting said spring stop.

7. A latch system as recited in claim 1, comprising a computer, said computer having a body, a stand, and a hinge about which said stand is pivotable relative to said body, said hinge incorporating said latch, said latch spring, said impact damper, and said damper spring.

8. A latch system as recited in claim 7, wherein said computer is an all-in-one computer having a display in said body.

9. A computer comprising:
   a body;
   a stand; and
   a hinge pivotally attaching the body to the stand, the hinge comprising;
      a latch slideable between a latch position and a release position, said latch having a latch wedge and a damper stop;
      a latch spring urging said latch toward said latch position;
      an impact damper;
      a damper spring urging said impact damper against said damper stop, wherein, in response to a transient mechanical impact applied on said latch wedge,
         a momentum of said transient mechanical impact is transferred through said latch wedge to said impact damper to cause said impact damper to move away from said damper stop and against said damper spring, while said latch remains in said latch position responsive to a force applied by said latch spring,
      wherein said impact damper is moveable by said damper spring back to engage said damper stop after said impact damper has moved away from said damper stop in response to said transient mechanical impact, to maintain said latch in said latch position.

10. A computer as recited in claim 9, wherein said latch includes an elongated shaft that extends at least partially through said impact damper.

11. A computer as recited in claim 9, wherein said latch spring extends at least partially through said damper spring.

12. A computer as recited in claim 9, wherein said latch includes a spring stop, said latch spring contacting said spring stop.

13. A latch system as recited in claim 1, wherein said transient mechanical impact on said latch wedge is produced by movement of a strike plate relative to said latch wedge, and wherein said latch remaining in said latch position prevents said strike plate from clearing said latch.

14. A computer as recited in claim 9, wherein the hinge further comprises a strike plate moveable to impact said latch wedge.

15. A computer as recited in claim 14, wherein said strike plate is moveable in response to said stand moving relative to said body.

16. A computer as recited in claim 9, wherein, in response to a continuous force applied on said latch wedge urging said latch toward said release position, said latch does not separate from said impact member but rather moves with said impact damper toward said release position.

\* \* \* \* \*